United States Patent
Dugan et al.

(10) Patent No.: US 6,176,267 B1
(45) Date of Patent: Jan. 23, 2001

(54) MOLDED PROTECTOR FOR A HYDRAULIC FITTING

(75) Inventors: Luke Dugan, Girard; Bernard Spattifor; Charles Szewczykowski, both of Erie, all of PA (US)

(73) Assignee: Niagara Plastics Company, Erie, PA (US)

( * ) Notice: Under 35 U.S.C. 154(b), the term of this patent shall be extended for 0 days.

(21) Appl. No.: 09/429,197

(22) Filed: Oct. 28, 1999

Related U.S. Application Data

(60) Provisional application No. 60/105,983, filed on Oct. 28, 1999.

(51) Int. Cl.[7] ............................................. F16L 55/10
(52) U.S. Cl. ................................. 138/89; 138/96 R
(58) Field of Search ............................. 138/96 R, 96 T, 138/89, 89.1–89.4

(56) References Cited

U.S. PATENT DOCUMENTS

| | | | | |
|---|---|---|---|---|
| 1,229,928 | * | 6/1917 | Frazer | 138/89.4 |
| 1,302,441 | * | 4/1919 | Schweinert et al. | 138/89.4 |
| 1,709,677 | * | 4/1929 | Metzinger | 138/89.3 |
| 2,304,532 | * | 12/1942 | Boxley | 138/96 R X |
| 2,379,529 | * | 7/1945 | Kennedy | 138/89 |
| 2,899,483 | * | 8/1959 | Robertson et al. | 138/96 R X |
| 4,146,058 | * | 3/1979 | Bercovitz | 138/96 R |
| 4,202,378 | * | 5/1980 | Bush et al. | 138/96 R |
| 4,483,371 | * | 11/1984 | Susin | 138/89.4 |

FOREIGN PATENT DOCUMENTS

485622 * 8/1952 (CA) ................................. 138/96 R

* cited by examiner

*Primary Examiner*—Patrick Brinson
(74) *Attorney, Agent, or Firm*—Webb Ziesenheim Logsdon Orkin & Hanson, P.C.

(57) ABSTRACT

A molded protector for a hydraulic fitting such as an O-ring face seal includes a circular base and an annular skirt extending from the base. A plurality of ribs on an internal surface of the skirt with each rib adapted to frictionally engage one of the outer surfaces of the coupling nut of the O-ring face seal fitting. The frictional engagement of the ribs on the flats is combined with the frictional engagement of the annular skirt with the corner portions of the coupling nut to secure the protector in position. Additionally, the ribs are included with a beveled leading end to assist in the alignment of the protector during installation.

20 Claims, 2 Drawing Sheets

MOLDED PROTECTOR FOR A HYDRAULIC FITTING

This application claims the benefit of U.S. Provisional patent application Ser. No. 60/105,983, filed Oct. 28, 1999, entitled "Molded Protector for O-Ring Face Seal".

BACKGROUND OF THE INVENTION

1. Field of the Invention

The present invention relates to a plastic protector, or cap, more specifically, the present invention relates to a molded protective cap for a hydraulic fitting.

2. Background Information

FIG. 1 illustrates a conventional O-ring face seal for a hydraulic fitting 10. The fitting 10 includes a stem 12 defining a hydraulic fluid passage 14. At the end of the stem 12 is an enlarged annular flange or face 16. An internally threaded coupling nut 18 is slidable along the stem up to the face 16. The coupling nut 18 has a hexagonal exterior configuration with the planar faces thereof used for securing the fitting in a conventional fashion.

An existing protector 20 or cap exists for the fitting 10. The existing protector 20 is generally a plastic component with an annular skirt 22 extending from a base 24. The annular skirt 22 engages with the corner portions formed by adjacent faces of the coupling nut 18 to secure the protector 20 in position. The existing protector 20 additionally includes an annular stop 26 extending from the base 24 at a position adapted to abut against the face 16. In operation, the existing protector 20 is pushed onto the coupling nut 18 when the fitting 10 is not in use, such as during shipping thereof. The protector 20 is pushed onto the coupling nut 18 until the stop 26 abuts against the face 16 at the end of the stem 12. Frictional engagement between the skirt 22 and the corners of the hexagonal coupling nut 18 are intended to maintain the protector in position. The protector 20 is intended to prevent contamination of the fitting 10 during shipping or when the fitting 10 is not in use.

The existing protector 20 has several disadvantages. One disadvantage is that only the skirt 22 frictionally engages the coupling nut 18 at the corner portions of the nut 18, which requires a relatively long skirt 22 to provide sufficient frictional engagement to maintain the protector 20 in position. In some circumstances, this frictional engagement may not be sufficient and the protector 20 may become dislodged during shipping or the like, which can lead to contamination and/or damage to the fitting 10. The length of the skirt 22 may result in additional alignment problems for the user increasing the difficulty in installing the protector 20.

It is an object of the present invention to provide a one-piece molded protector for a hydraulic fitting which overcomes the aforementioned drawbacks of the prior art. It is an object of the present invention to provide a protector for an existing hydraulic fitting which provides frictional engagement between the protector and the coupling nut 18 at positions in addition to the corners of the coupling nut 18. It is a further object of the present invention to provide a protector for a hydraulic fitting which improves alignment issues for the protector for easier installation of the protector. Further objects of the present invention are to provide a protector which is easy to manufacture and easy to use which is held in place throughout the shipping of the hydraulic fitting.

SUMMARY OF THE INVENTION

The objects of the present invention are achieved by a protector for a hydraulic fitting according to the present invention. The protector of the present invention is in the form of a cap having a circular base with an annular skirt extending from the base. The annular skirt includes a plurality of ribs on the inner surface of the annular skirt wherein, in operation, each rib is adapted to frictionally engage one flat outer surface of the coupling nut of the hydraulic fitting and the annular skirt is adapted to frictionally engage the corners formed by adjacent flats of the connecting nut. Each of the ribs may further include a beveled or tapered end at a leading end thereof which will help center and align the protector during installation.

In one specific embodiment of the present invention, six ribs are provided, with each rib adapted to engage a separate flat of the coupling nut. The protector of the present invention may further include a stop member extending from the base with the stop adapted to abut against the face of the fitting in the installed position. The stop may be in the form of at least three radially extending panel members. The base member may further include a gripping flange extending radially beyond the annular skirt to provide assistance in removing the protector. Further, the flat outer face of the base provides sufficient surface for vendor and part information to be embossed or otherwise incorporated directly thereon. In another embodiment, the at least three radially extending panel members include beveled edges, allowing the present invention to securely abut and grip the inside, beveled walls of a second type of hydraulic fitting.

These and other advantages of the present invention will be clarified in the brief description of the preferred embodiments taken together with the attached figures wherein like reference numeral represent like elements throughout.

BRIEF DESCRIPTION OF THE PREFERRED EMBODIMENTS

Figure 3:
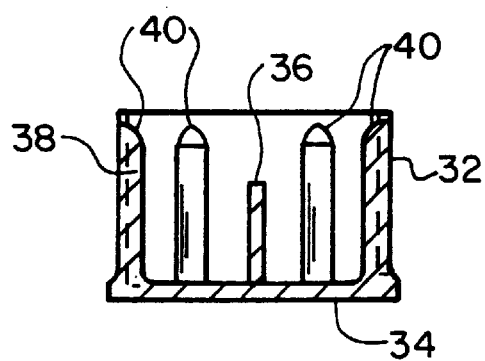
FIG. 3 is a cross-sectional view of the protector illustrated in FIG. 2 taken along line III—III.
Figure 4:
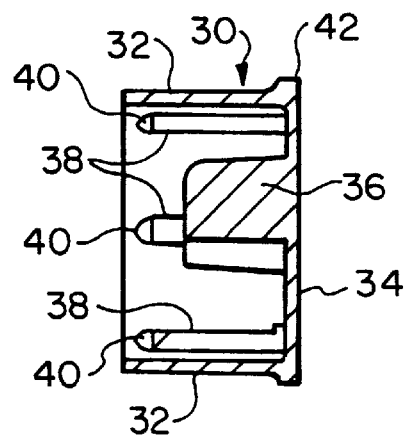
FIG. 4 is a cross-sectional view of the fitting illustrated in FIG. 2 taken along line IV—IV.
Figure 5:
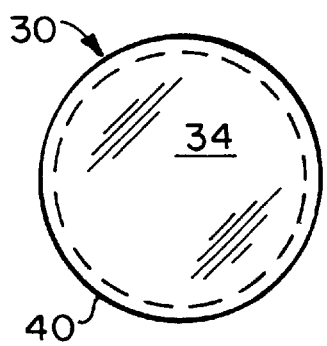
FIG. 5 is a rear view of the protector illustrated in FIG. 2.
Figure 6:
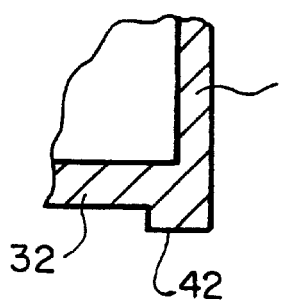
FIG. 6 is an enlarged view of a portion of the protector illustrated in FIG. 4.

As shown in FIGS. 2–8, the protector 30 according to the present invention is in the form of a cap having an annular skirt 32 extending from a circular base 34. The protector 30 additionally includes a stop 36 extending from a central portion of the base 34. The protector 30 additionally includes six equally space ribs 38 on an inner surface of the skirt 32. As best shown in FIGS. 3 and 4, the leading end 40 of each rib 38 is tapered toward the annular skirt 32. The stop 36 is formed of three radially extending panel members positioned 120° apart. The base 34 additionally includes a gripping flange 42 extending radially beyond the annular skirt 32, as shown in detail in FIG. 6. Additionally, as shown in FIG. 5, the rear face of the base 34 provides a position for indicating indicia to be molded, embossed or otherwise positioned thereon. The indicating indicia may be for the vendor name, the part number or the like.

Figure 7:
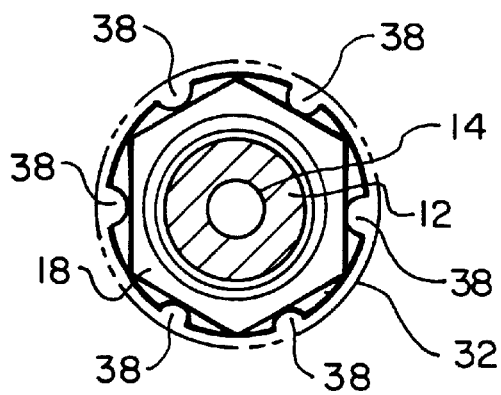
FIG. 7 is a sectional view of the protector illustrated in FIG. 2 installed on the conventional O-ring face seal fitting shown in FIG. 1.

In operation and according to the first embodiment of the present invention, the protector 30 is pushed onto the coupling nut 18 of the existing hydraulic fitting 10 until the stop 36 engages with the face 16. As shown in FIG. 7, the ribs 38 will frictionally engage the flat faces of the coupling nut 18 in addition to frictional engagement of the corners of the coupling nut 18 with the annular skirt 32. During the installation procedure, the tapering or beveling of the leading end 40 of the ribs 38 helps to align the protector 30 for easy installation of the protector 30.

Figure 1:
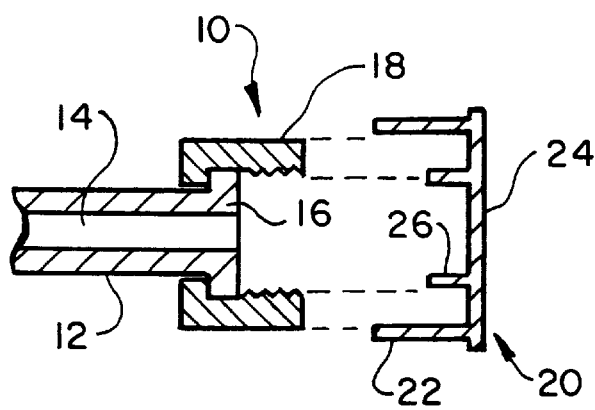
FIG. 1 is an exploded cross-sectional view of a conventional hydraulic fitting and an existing prior art protector therefor.
Figure 2:
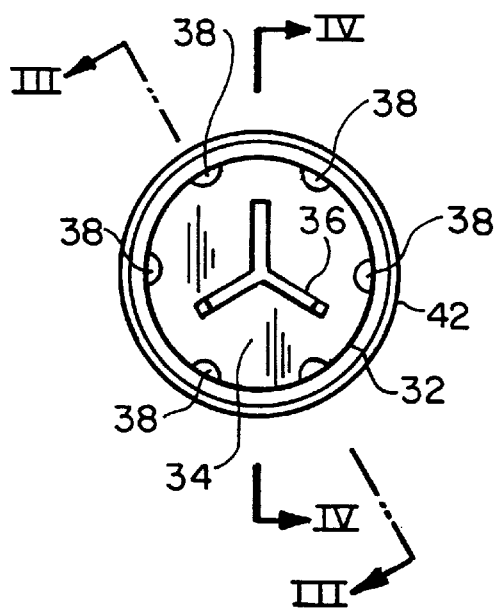
FIG. 2 is a front view of a first embodiment of the protector according to the present invention for the conventional hydraulic fitting shown in FIG. 1.

The protector 30 provides several advantages over the protectors 20 illustrated in FIG. 1. First, the additional six internal ribs 38 provide internal gripping action on the six flat outer surfaces of the coupling nut 18 to assist in holding the protector 30 in position. The provision of the ribs 38 in conjunction with the annular skirt 32 provides sufficient force to maintain the protector 30 in position by increasing the relevant frictional forces provided. Further, the ribs 38 prevent the relative rotation between the protector 30 and the coupling nut 18 which would otherwise occur and result in unwanted loosening of the protector 30. The frictional engagement of the both the ribs 38 and the annular skirt 32 allows for the relative length of the skirt 32 to be less than the protector 30. The shorter skirt 22 helps avoid alignment issues during installation. As discussed above, the tapered leading ends 40 of the ribs 38 further assist in the alignment of the protector 30 of the present invention. Additionally, in operation, the flange 42 provides for position for gripping and removing of the protector 30. The protector 30 is preferably a one-piece plastic part made by injection molding or the like.

Figure 8:
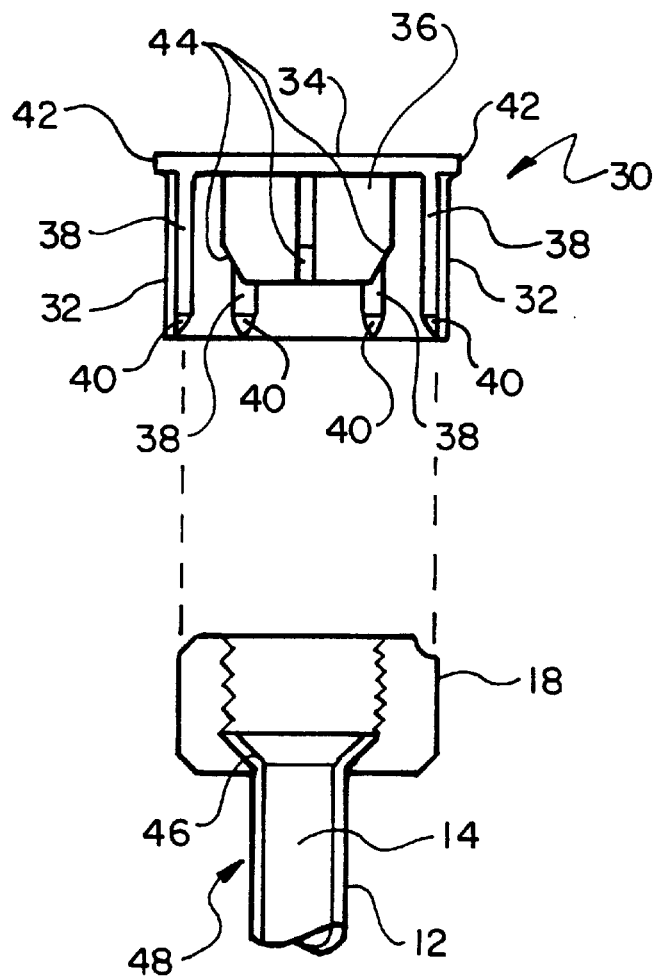
FIG. 8 is an exploded cross-sectional view of a hydraulic fitting with a beveled face and a second embodiment of the protector according to the the present invention for the hydraulic fitting tube.

Turning to FIG. 8, a second type of hydraulic fitting 48, like a conventional hydraulic fitting 10, includes a stem 12 defining a hydraulic fluid passage 14. Further, an internally threaded coupling nut 18 is slidable along the stem 12. This internally threaded coupling nut 18 has a hexagonal exterior configuration with the planar faces thereof used for securing the fitting in a conventional fashion. However, unlike the conventional hydraulic fitting 10, the second type of hydraulic fitting 48 has an outwardly beveled face 46.

In the second embodiment of the present invention, also illustrated in FIG. 8, the protector 30 utilizes inwardly beveled, leading edges 44 on the stop 36 panel members. These inwardly beveled, leading edges 44 are designed to flushly interlock with the outwardly beveled face 46 of hydraulic fitting 48. Using these inwardly beveled, leading edges 44, the protector 30 can be securely attached over the coupling nut 18, engaging both the coupling nut 18 and the outwardly beveled face 46 of the second type of hydraulic fitting 48.

It will be apparent to those of ordinary skill in the art that various modifications may be made to the present invention without departing from the spirit and scope thereof. For example, various configurations can be designed for the stop 36, such as using four or more panels or an annular member, without effecting the operation of the protector 30 of the present invention. Consequently, the scope of the present invention is intended to defined by the appended claims and equivalents thereto.

What is claimed is:

1. A protector for a hydraulic fitting having a coupling nut surrounding a hydraulic conduit, said protector in the form of a cap comprising:
    a circular base;
    an annular skirt extending from said base;
    a stop extending from said base spaced from and surrounded by said annular skirt, said stop adapted to abut against a face of the hydraulic fitting when said protector is in the operative position; and
    a plurality of ribs on an inner surface of said annular skirt, wherein in an operative position each said rib is adapted to frictionally engage one outer surface of the coupling nut of the hydraulic fitting.

2. The protector of claim 1 wherein said annular skirt is continuous and is adapted to frictionally engage corners formed by adjacent flat surfaces of the coupling nut when said protector is in said operative position.

3. The protector of claim 1 wherein each said rib further includes a tapered leading end, wherein said tapered leading end provides a self-alignment for proper positioning of said protector during installation.

4. The protector of claim 1 wherein said stop is formed by at least three radially extending panel members.

5. The protector of claim 4 wherein said at least three radially extending panel members further include inwardly beveled leading edges, wherein said inwardly beveled leading edges are adapted to allow said stop to abut an outwardly beveled face of a hydraulic fitting when said protector is in the operative position.

6. The protector of claim 1 wherein said circular base includes a gripping flange extending radially beyond said annular skirt.

7. The protector of claim 1 further including six of said ribs equally spaced around said annular skirt, wherein each said rib is adapted to frictionally engage a separate outer surface of the coupling nut.

8. The protector of claim 7 wherein said annular skirt is continuous and is adapted to frictionally engage each corner of the coupling nut at a position between adjacent ribs.

9. A one-piece injection molded plastic protective cap for a conventional hydraulic seal fitting comprising:
    a circular base;
    an annular skirt extending from a first side of said base, wherein said annular skirt is adapted to frictionally engage corner portions of a coupling nut of the hydraulic seal fitting;
    a stop extending from said circular base spaced from and surrounded by said annular skirt; and
    six ribs equally spaced on an inner surface of said annular skirt, each said rib adapted to frictionally engage a flat outer surface of the coupling nut.

10. The protector of claim 8 wherein each said rib includes a tapered leading end, said tapered leading end adapted to align said protector during installation.

11. The protector of claim 8, wherein said stop further includes a plurality of radially extending panel members equally spaced from each other.

12. The protector of claim 8 wherein said circular base further includes a gripping flange extending radially beyond said annular skirt.

13. An O-ring face seal fitting and protector combination comprising:
    a stem defining a central hydraulic passage and a radially extending face flange at one end thereof;
    a coupling nut slidable along said stem to a position abutting against said face flange, said coupling nut including a threaded interior and six flat outer surfaces forming a hexagonal exterior surface; and a protector for said O-ring face seal fitting comprising:
a circular base;
an annular skirt extending from said base; and
a plurality of ribs on an inner surface of said annular skirt wherein in an operative position, each said rib is adapted to frictionally engage one flat outer surface of said coupling nut.

14. The combination of claim 13 wherein said annular skirt is adapted to frictionally engage corners formed by adjacent flat surfaces of said coupling nut when said protector is in said operative position.

15. The combination of claim 13 wherein each said rib further includes a tapered leading end, wherein said tapered leading end provides a proper alignment for proper positioning of said protector during installation.

16. The combination of claim 13 further including a stop extending from said base, said stop adapted to abut against said face flange when said protector is in said operative position.

17. The combination of claim 16 wherein said stop is formed by at least three radially extending panel members.

18. The combination of claim 13 wherein said circular member includes a gripping flange extending radially beyond said annular skirt.

19. The combination of claim 13 further including six of said ribs equally spaced around said annular skirt, wherein each said rib is adapted to frictionally engage a separate flat of said coupling nut.

20. The protector of claim 1, wherein said stop is spaced radially inwardly of said annular skirt and said plurality of ribs.

* * * * *

UNITED STATES PATENT AND TRADEMARK OFFICE
CERTIFICATE OF CORRECTION

PATENT NO. : 6,176,267
DATED : January 23, 2001
INVENTOR(S) : Luke Dugan et al.

It is certified that error appears in the above-identified patent and that said Letters Patent is hereby corrected as shown below:

Title Page, [60] Related U.S. Application Data, "1999" should read -- 1998 --.

Signed and Sealed this

Fifteenth Day of May, 2001

Attest:

NICHOLAS P. GODICI

Attesting Officer

Acting Director of the United States Patent and Trademark Office